United States Patent
Lewis et al.

(10) Patent No.: US 11,136,135 B2
(45) Date of Patent: Oct. 5, 2021

(54) MULTI-TIERED CONDITIONAL ANALYSIS ENGINE

(71) Applicant: Bell Helicopter Textron Inc., Fort Worth, TX (US)

(72) Inventors: Daniel Robert Lewis, Arlington, TX (US); Alan Soo Love, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 414 days.

(21) Appl. No.: 15/477,889

(22) Filed: Apr. 3, 2017

(65) Prior Publication Data

US 2017/0203854 A1    Jul. 20, 2017

Related U.S. Application Data

(63) Continuation-in-part of application No. 14/974,875, filed on Dec. 18, 2015, now Pat. No. 9,688,421.

(60) Provisional application No. 62/317,304, filed on Apr. 1, 2016.

(51) Int. Cl.
| | |
|---|---|
| *B64D 45/00* | (2006.01) |
| *B64F 5/60* | (2017.01) |
| *G07C 5/00* | (2006.01) |
| *G07C 5/08* | (2006.01) |
| *B64C 27/04* | (2006.01) |

(52) U.S. Cl.
CPC ............. *B64D 45/00* (2013.01); *B64F 5/60* (2017.01); *G07C 5/00* (2013.01); *G07C 5/08* (2013.01); *B64C 27/04* (2013.01); *B64D 2045/0085* (2013.01)

(58) Field of Classification Search
CPC .............. B64D 45/00; B64D 43/00; B64D 2045/0085; B64F 5/60; B64C 27/04; B64C 27/12; B64C 27/46; G07C 5/00
USPC .................................................. 701/3, 4, 13
See application file for complete search history.

(56) References Cited

U.S. PATENT DOCUMENTS

| | | | |
|---|---|---|---|
| 4,736,331 A * | 4/1988 | Lappos ................ | B64D 43/00 701/14 |
| 8,682,509 B2 | 3/2014 | Goodrich et al. | |
| 9,102,417 B1 | 8/2015 | Young | |
| 9,688,421 B1 * | 6/2017 | Love ..................... | B64F 5/60 |
| 2011/0054721 A1 | 3/2011 | Goodrich et al. | |
| 2012/0042273 A1 * | 2/2012 | Dingeman ............ | G06F 17/5095 715/771 |
| 2013/0211737 A1 | 8/2013 | Batcheller et al. | |
| 2017/0174363 A1 | 6/2017 | Love | |

FOREIGN PATENT DOCUMENTS

EP          3025964 A1      6/2016

OTHER PUBLICATIONS

European Search Report in related European Patent Application No. 18164529.2 dated Oct. 1, 2018, 4 pages.

(Continued)

*Primary Examiner* — Gertrude Arthur Jeanglaude
(74) *Attorney, Agent, or Firm* — Lightfoot & Alford PLLC

(57) ABSTRACT

A regime recognition system for an aircraft has a regime engine configured to identify a sub-regime performance of the aircraft only after having identified a top tier or top level regime performance that can include the sub-regime performance.

3 Claims, 6 Drawing Sheets

(56) References Cited

OTHER PUBLICATIONS

European Exam Report in related European Patent Application No. 18164529.2 dated Oct. 26, 2018, 7 pages.
European Exam Report in related European Patent Application No. 18164529.2 dated May 17, 2019, 5 pages.

* cited by examiner

MULTI-TIERED CONDITIONAL ANALYSIS ENGINE

CROSS-REFERENCE TO RELATED APPLICATIONS

This patent application is a continuation-in-part of U.S. patent application Ser. No. 14/974,875, filed on 18 Dec. 2015 and entitled "AIRCRAFT COMPONENT REGIME RECOGNITION," the entire content of which is hereby expressly incorporated by reference.

This patent application also claims the benefit of the filing date of U.S. Provisional Patent Application Ser. No. 62/317,304, filed on 1 Apr. 2016 and entitled "MULTI-TIERED CONDITIONAL ANALYSIS ENGINE," the entire content of which is hereby expressly incorporated by reference.

BACKGROUND

Some data, such as, but not limited to data collected from sensors of an aircraft, can be useful in characterizing system use and/or wear. For example, data collected from an aircraft or other vehicle can be utilized to determine what types of actions the aircraft or other vehicle has undertaken and for how long. In some cases, identifying actions, uses, and/or generally understanding how an aircraft, a vehicle, and/or any other physical system has been used can provide valuable information regarding an expected lifespan of the system, components of the system, and/or generally how to better schedule and/or instruct usage of the system. In some cases, systems, whether physical systems, simulated systems, and/or other data sources require parsing though an entire set of data to identify characteristic behaviors regardless of what behaviors have already been found in the same data set.

DETAILED DESCRIPTION

Figure 1:
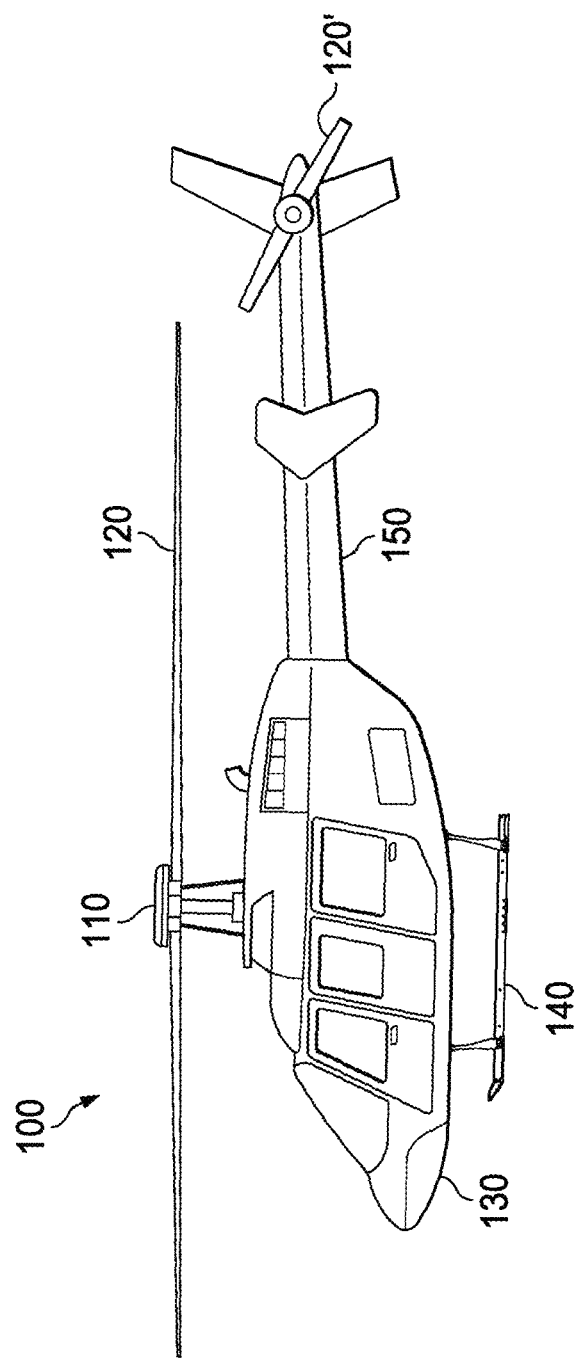
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Rotorcraft 100 may perform a variety of different missions. Some missions may subject rotorcraft 100 to more stress than other missions. For example, some missions may include high-stress flight regimes (e.g., a high-speed turn with a high bank angle), whereas other missions may focus primarily on lower-stress flight regimes (e.g., straight-and-level flight). A flight regime may include any operating condition of an aircraft, including any scenario that could potentially change the health of an aircraft. Some flight regimes may be defined broadly (e.g., rotorcraft hover), whereas other flight regimes may be defined narrowly (e.g., a specific turn at specific angles in specific environmental conditions, etc.).

Figure 2:
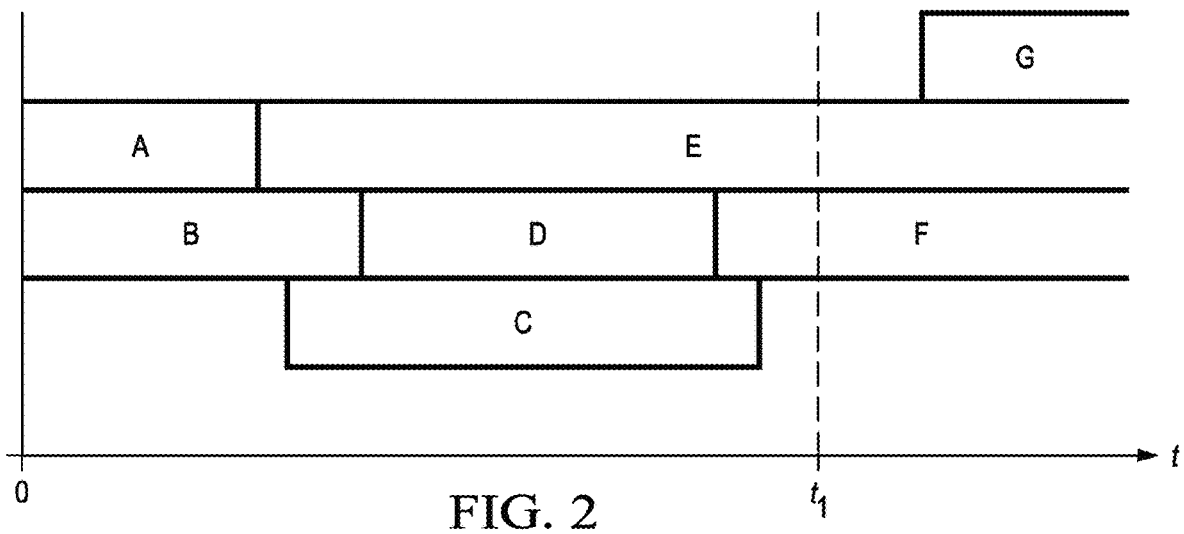
FIG. 2 shows different example regimes in which the rotorcraft of FIG. 1 may operate between time 0 and time t.

During operation of rotorcraft 100, rotorcraft 100 may operate in multiple regimes at the same time. For example, FIG. 2 shows different example regimes in which rotorcraft 100 may operate between time 0 and time t. The example of FIG. 2 shows seven regimes labeled A-G, but rotorcraft 100 may operate in more, fewer, or otherwise different regimes.

Regimes such as Regimes A-G may be identified in a variety of different ways. In one example embodiment, rotorcraft 100 is equipped with a variety of flight measurement sensors. Each flight measurement sensor may measure one or more facets of aircraft performance (e.g., airspeed, density altitude, bank angle, etc.). Regimes may be identified based on the measurements received from the flight measurement sensors located on that rotorcraft 100.

Figure 3:
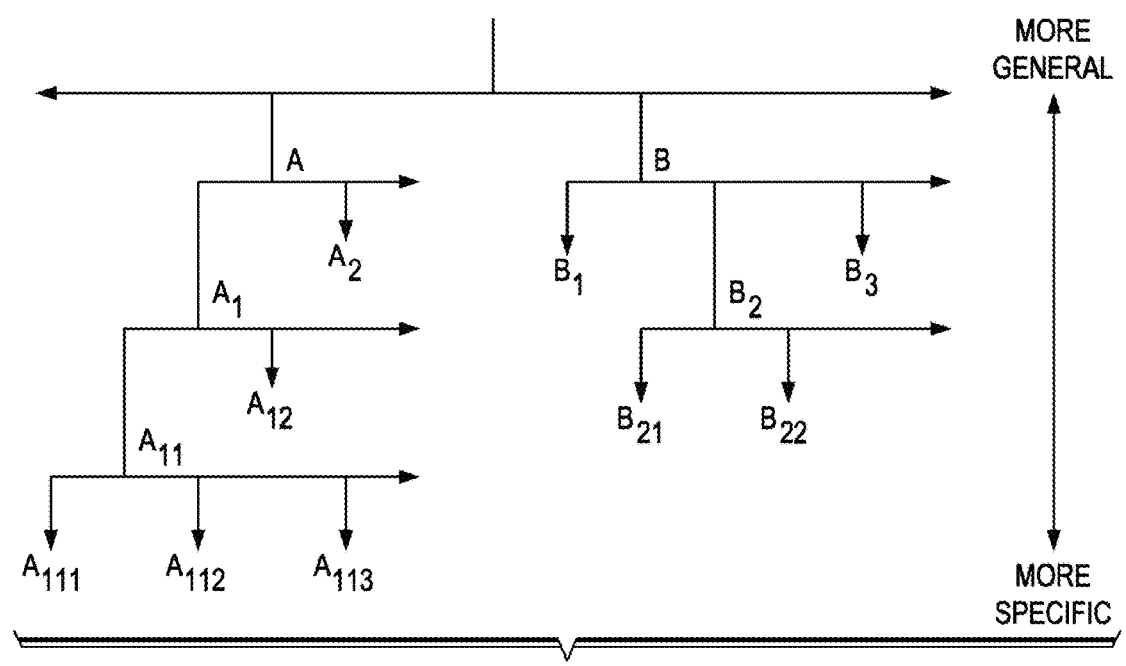
FIG. 3 shows a hierarchical definition scheme according to one example embodiment.

Regimes such as Regimes A-G may be defined in a variety of different ways. For example, FIG. 3 shows a hierarchical definition scheme 300 according to one example embodiment. In the example of FIG. 3, the regimes are arranged in a hierarchy from general to specific. For example, regime A includes sub-regimes A1, A2, and so forth; sub-regime A1 includes sub-sub-regimes A11, A12, and so forth; and sub-regime A11 includes sub-sub-sub-regimes A111, A112, A113, and so forth. In this example, the flight data may be used to eliminate regimes and narrow down the selection to the most specific regime possible. For example, if the flight data proves that rotorcraft 100 was operating in regimes A112 or A113, then flight regime A12 may be selected because it includes all of the possible flight regimes, A112 and A113.

Teachings of certain embodiments recognize that hierarchies may be defined such that all flight activity may fall into at least one regime within the hierarchy. For example, even if data is missing or flight activity is unrecognizable, the flight activity may be categorized into a highest-level regime in the hierarchy that encompasses all potential flight scenarios. The highest-level regime may be associated with damage assumptions about flight operations that are more extreme than the actual damage incurred, but such assumptions may be safer than just leaving the flight activities unassigned to regimes. In some embodiments, time periods of flight that are not recognizable may be labeled simply as Unrecognized Time.

Returning to the example of FIG. 2, Regimes A-G are shown. Combining the concepts of FIGS. 2 and 3, FIG. 2 could be re-shown to include sub-regimes and so forth if flight data supports selection of more specific regimes.

Once regimes are identified, health assessments may be performed by analyzing how operating in these regimes causes damage to the aircraft. Typically, if an aircraft is operating in multiple regimes at the same time, the most damaging regime is selected for analysis.

In the example of FIG. 2, a time t1 is identified. At this time t1, rotorcraft 100 is operating in Regimes E and F. By way of example, assume that Regime E represents a right-turn maneuver and Regime F represents a control reversal. Generally speaking, control reversals are more damaging than right turns for an aircraft such as rotorcraft 100. Therefore, the damage caused to the aircraft would be determined by assessing how much damage was caused by operating in the control reversal regime.

This approach, however, ignores how operating within different regimes effects individual components installed on the aircraft. For example, although control reversals are probably more damaging to most aircraft components, but this may not be true for all aircraft components. Thus, performing regime recognition and health assessment on an aircraft level may lack the necessary accuracy. In addition, because aircraft parts are maintained and replaced on a component level, component-level regime recognition and health assessment may be more relevant to when an aircraft component should be inspected or replaced.

Accordingly, teachings of certain embodiments recognize the capability to track regime usage history at the component level instead of the vehicle level. Teachings of certain embodiments recognize the capability to identify several overlapping regimes and then select one of the overlapping regimes for each component. Returning to the example of Regimes E and F, Regime E might be selected for a first aircraft component, and Regime F might be selected for a second aircraft component. This might be the case, for example, if the first aircraft component is more sensitive to right turns and the second aircraft component is more sensitive to control reversals.

Figure 4:
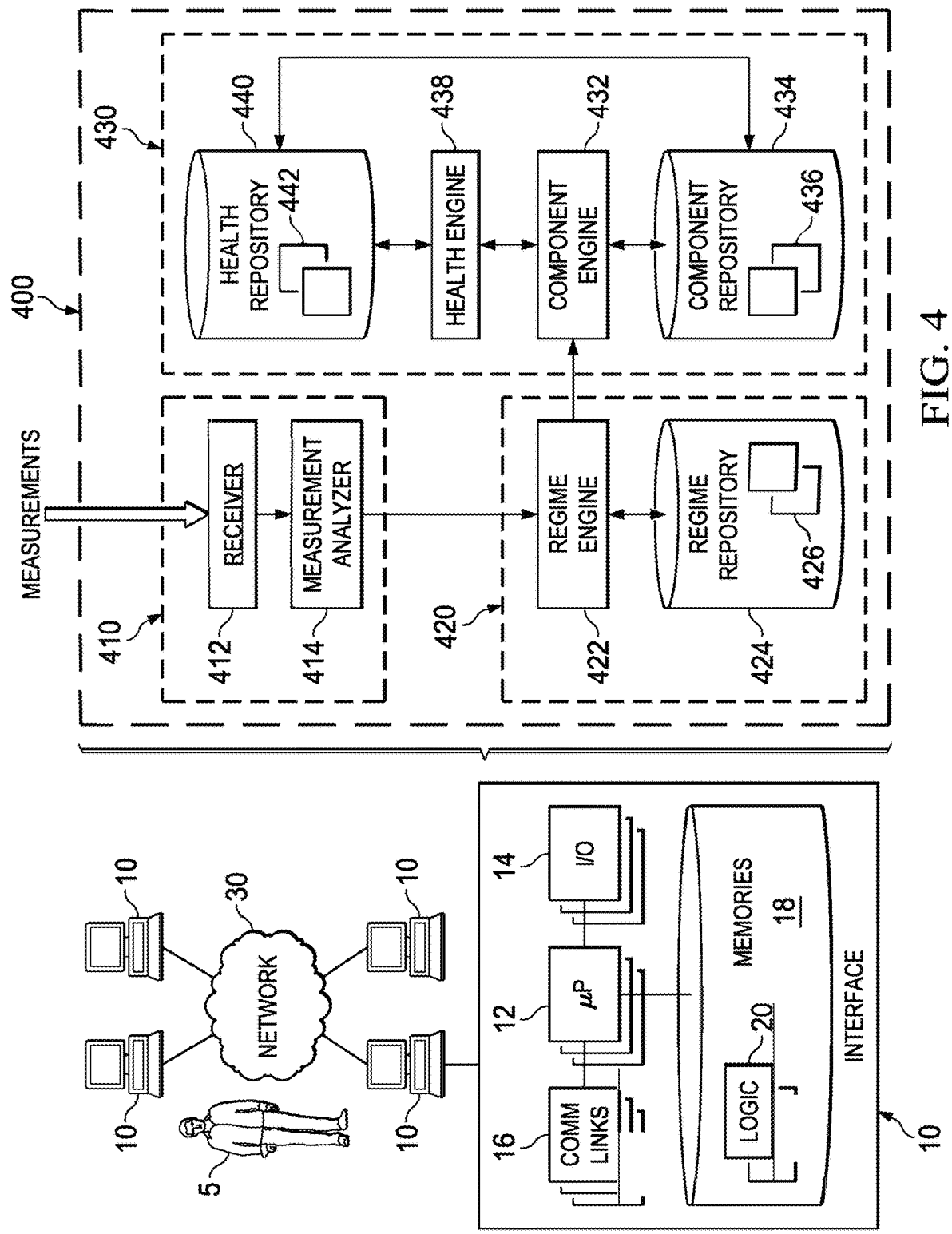
FIG. 4 shows an example system for assessing health of two or more components of an aircraft such as the rotorcraft of FIG. 1.

FIG. 4 shows a system 400 for assessing health of two or more components of an aircraft according to one example embodiment. In the example of FIG. 4, system 400 features a measurement system 410, a regime recognition system 420, and a health assessment system 430, which may be implemented by one or more computers 10 and may be accessed by a user 5. In operation, regime recognition system 420 may analyze measurements received from the aircraft via measurement system 410 and may identify different regimes based on the flight activity of the aircraft. Health assessment engine 430 may assign the identified regimes to individual components and perform health assessments based on these assignments.

Elements of system 400 may be installed on or off an aircraft such as rotorcraft 100. For example, in some embodiments, just measurement system 410 is installed on-board the aircraft, and regime recognition system 420 and health assessment system 430 are located in a remote location. In other embodiments, measurement system 410, regime recognition system 420, and health assessment system 430 are all installed on-board the aircraft. In some embodiments, elements of system 400 are integrated with the aircraft such that the aircraft and system 400 form a single, inter-operational system.

Users 5 may access system 400 through computer systems 10. For example, in some embodiments, users 5 receive outputs from health assessment system 430. Users 5 may include any individual, group of individuals, entity, machine, and/or mechanism that interacts with computer systems 10. Examples of users 5 include, but are not limited to, a service person, pilot, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer regime cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer regime cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Measurement system 410 includes a receiver 412 and a measurement analyzer 414. Receiver 412 may receive measurements of flight profiles for an aircraft. In one example embodiment, receiver 412 receives the measurements from measurement sensors associated with the aircraft. Receiver 412 may be located on or off an aircraft. For example, in some embodiments, receiver 412 is located on an aircraft and is in communication with a physical storage device also located on the aircraft. This physical storage device may store measurements of flight parameters for later processing.

Measurement analyzer 414 receives and processes measurements from receiver 412. In one example embodiment, measurement analyzer 414 identifies loads and other information based on the received measurements that may be used for regime recognition. Measurement analyzer 414 may also identify timestamps corresponding to the received measurements so that regime recognition system 420 may determine the time spent in each regime or even create a time history of regimes.

Regime recognition system 420 includes a regime engine 422 and a regime repository 424. Regime repository stores flight regime records 426. Each flight regime record 426 defines a flight regime. A flight regime may be defined in a variety of ways. In one example embodiment, the flight regime records 426 may define the flight regimes in a hierarchy such as hierarchal definition scheme 300. The flight regime records 426 may also identify loads and other measurement information corresponding to the flight regimes.

Regime engine 422 identifies flight regimes that the aircraft operated in. In some embodiments, regime engine 422 identifies the flight regimes based on a comparison of the measurements received and processed by measurement analyzer 414 to the regime definitions stored in regime records 426.

Health assessment system 430 features a component engine 432, a component repository 434, a heath engine 438, and a health repository 440. Component repository 434 stores component records 436. Each component record 436 includes a prioritized list of flight regimes specific to a certain component. The component itself may be defined at any suitable level of specificity, from general (a fuselage) to specific (a bolt), from categorical (part model number XXXX) to individual (part serial number YYYYY).

Component engine 432 assigns the flight regimes identified by regime recognition system 420 to components of the aircraft. In some embodiments, the prioritized list for each component may help component engine 432 determine which regimes should be assigned to each component. For example, the prioritized list of flight regimes in a component record 436 may include an identification of which regimes cause greater damage to the component. If a component operated in two regimes at the same period of time, component engine 432 may assign the regime that causes greater damage to the component. Component engine 432 may reach this conclusion, for example, by consulting the prioritized list for the component and compare relative rankings of the different regimes to select the appropriate regime.

Health assessment engine 438 may determine the amount of damage inflicted on a component as a result of that component spending time in the flight regime assigned by component engine 432. In some embodiments, health assessment engine 438 may determine a change in health of the component resulting from this damage and adjust the remaining life of the component. Adjusting the remaining life of the component may include increasing or decreasing the amount of time (e.g., flight hours or some other measurement) until the component should be inspected, repaired, or replaced.

Health assessment engine 438 may store this health information in health records 442, which may be maintained in health repository 440. In some embodiments, health records 442 may correspond to component records 436 such that each health record 442 provides a health history of a component defined in a component record 436.

In operation, according to one example embodiment, regime recognition system 420 may determine that rotorcraft 100 operated in at least two regimes for a period of time. In this example, the rotorcraft has a plurality of components including first and second components. Component engine 432 may consult the prioritized lists for the first and second components stored in component records 436. Based on these prioritized lists, component engine 432 may assign one of the flight regimes to the first component based on the prioritized list of flight regimes in the first component's component record and may assign one of the flight regimes to the second component based on the prioritized list of flight regimes in the second component's component record. In this example, different flight regimes may be assigned to the two components because the different flight regimes may have different effects on the components.

Figure 5:
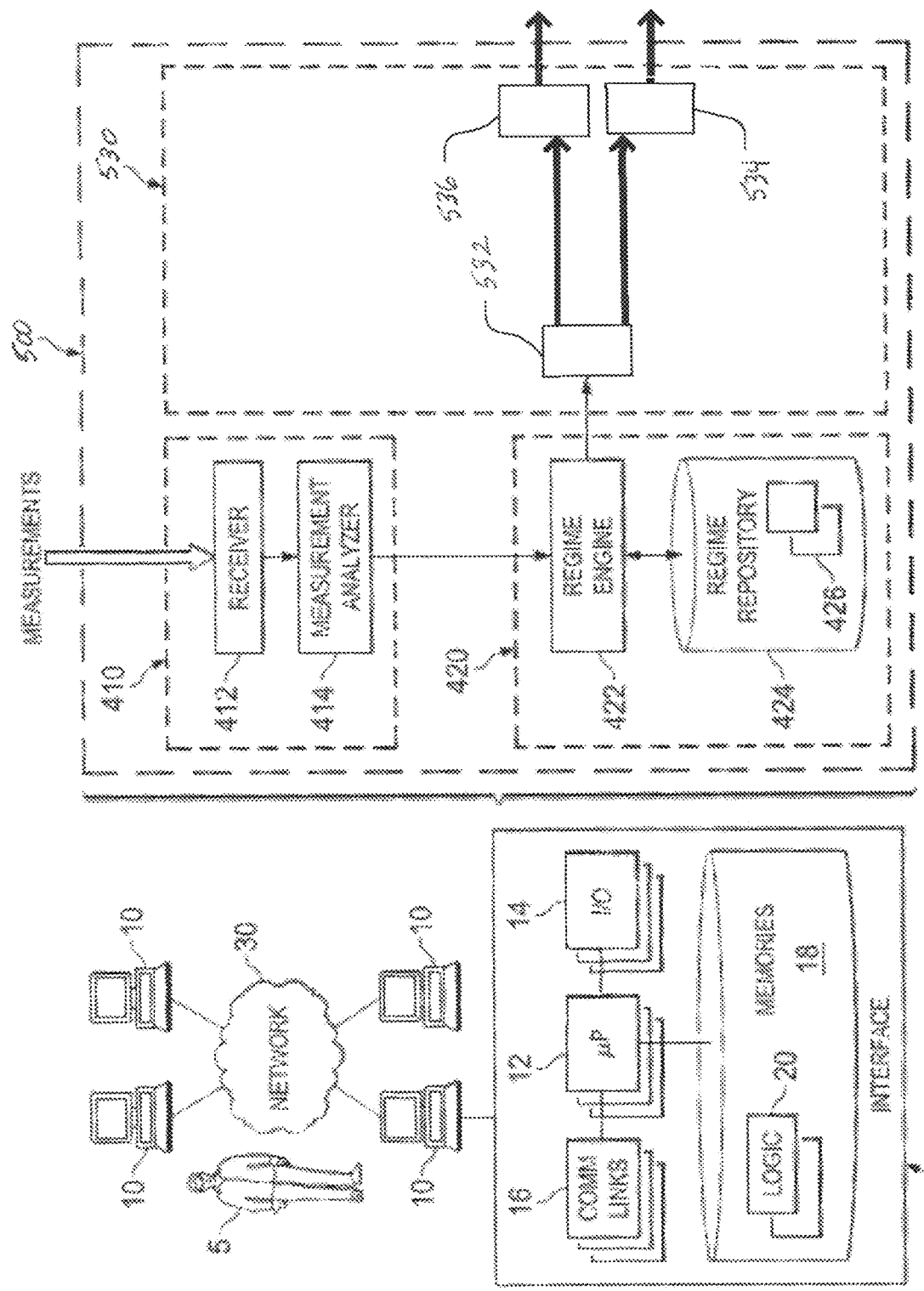
FIG. 5 shows an example system for efficiently determining regime occurrence and outputting and/or displaying the efficiently determined regime occurrences of an aircraft such as the rotorcraft of FIG. 1.

FIG. 5 shows a system 500 for regime recognition and communication of regime identification results. System 500 comprises results communication system 530 for communicating regime identification/determination results which may be implemented by one or more computers 10 and may be accessed by a user 5. In operation, regime recognition system 420 may analyze measurements received from the aircraft via measurement system 410 and may identify different regimes based on the flight activity of the aircraft. Results communication system 530 may display, announce, chart, and/or otherwise communicate at least some of the results of the operation of the regime recognition system 420. In some embodiments, the results communication system 530 may receive an output file 532 comprising a report, database, listing, and/or other organized output indicative of what regimes and/or conditions the regime engine 422 determined the rotorcraft 100 to have performed and/or been exposed to based on the data received by the receiver 412. In some embodiments the output file 532 may comprise data organized as necessary to generate an output display that may be visually displayed by the results communication system 530 using a computer monitor 534, audibly announced by the results communication system 530 using an audio speaker 536 and/or otherwise communicated to other systems or users. In some embodiments, the results communication system 530 may further communicate the data of the output file 532 to a flight computer of the rotorcraft 100 and the flight computer may cause a change in behavior or operation of the rotorcraft 100 in response to receiving the data of the output file 532.

Figure 6:
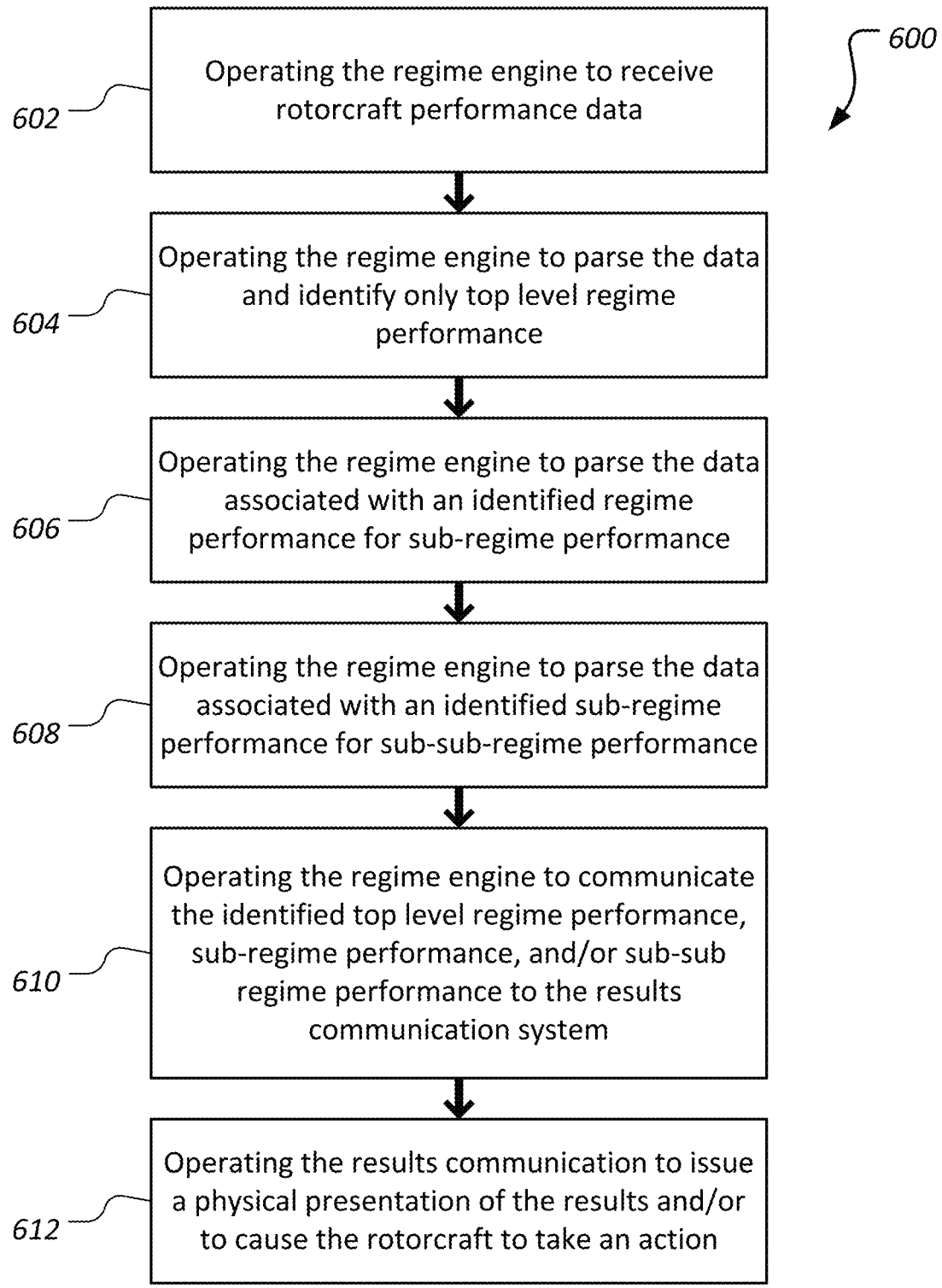
FIG. 6 shows a flowchart of a method of operating a system comprising a regime engine and a results communication system.

Referring now to FIG. 6, a method 600 of operating system 500 is shown. In some embodiments, the system 500 can be operated so that regime engine 422 receives rotorcraft performance data as shown at block 602. Next, the regime engine 422 can be operated to parse the rotorcraft performance data and identify only top level (or top tier) regime performance as shown at block 604. Next, the regime engine 422 can be operated to parse the data associated with a regime identified at block 604 and to identify a sub-regime performance as shown at block 606. Further, the regime engine 422 can be operated to parse the data associated with a sub-regime identified at block 606 and to identify a sub-sub-regime performance as shown at block 608. Next, the regime engine 422 can be operated to communicate the identified top level regime performance, the identified sub-regime performance, and/or the identified sub-sub-regime performance to the results communication system 530 as shown at block 610. Further, the results communication system 530 can be operated to issue a physical presentation of the results and/or to cause the rotorcraft 100 to take an action as shown at block 612.

In some embodiments, the regime engine can identify certain conditions within sequential time-series sensor data and relate them to the behavior of what the sensors were attached to. In some embodiments, the conditions and/or regimes can be defined with complex logic, thresholds, time durations, and the use of relationships to drill down to the root of the behavior. The regime engine 422 can be a software engine that takes in sequential time-series numerical data and identifies occurrences of user-defined behaviors (regimes) within the data. The regimes comprise entry and exit criterion based on supplied parameters and using logical operators and durations for validity. Multiple regimes can be tied together in a specific order or through logical connections to create a block (also user-defined). Regimes also have the option to be given a priority so that a regime with a higher priority has the ability to overwrite portions of a lower priority regime. The regime engine 422 utilizes a tiered identification process and supports up to N ordered tiers (Tier 1, Tier 2, Tier 3, Tier 4, . . . , Tier N) of regimes and blocks. Each tier has a parent/child relationship with its subsequent and consequent tier in which Tier 1 is the top parent (has no parent itself) and Tier N is the lowest child (has no children). Each Regime from a child tier must have one parent regime in the previous tier, but each regime in a parent tier can have zero to N child regimes in the next tier. This parent/child relationship amongst the tiers is reflected upon all defined tiers, and in all cases the parent is more generalized where the child is more specific in the definition. When processing each tier, the supplied dataset is filtered down to where only the individual parent regime's occurrence time is used for finding the more specific regimes. The tiered nature of operation allows dissection and identification of behavior and/or regimes down to any desired level. When using a tiered identification process, a simple definition can initially be provided to identify high level tiers while further parameters can be provided to eventually increase the complexity substantially by creating subsequent tiers. The child regimes end up being an extension of the parent and provide near limitless specificity and/or complexity to the identification process.

Figure 7:
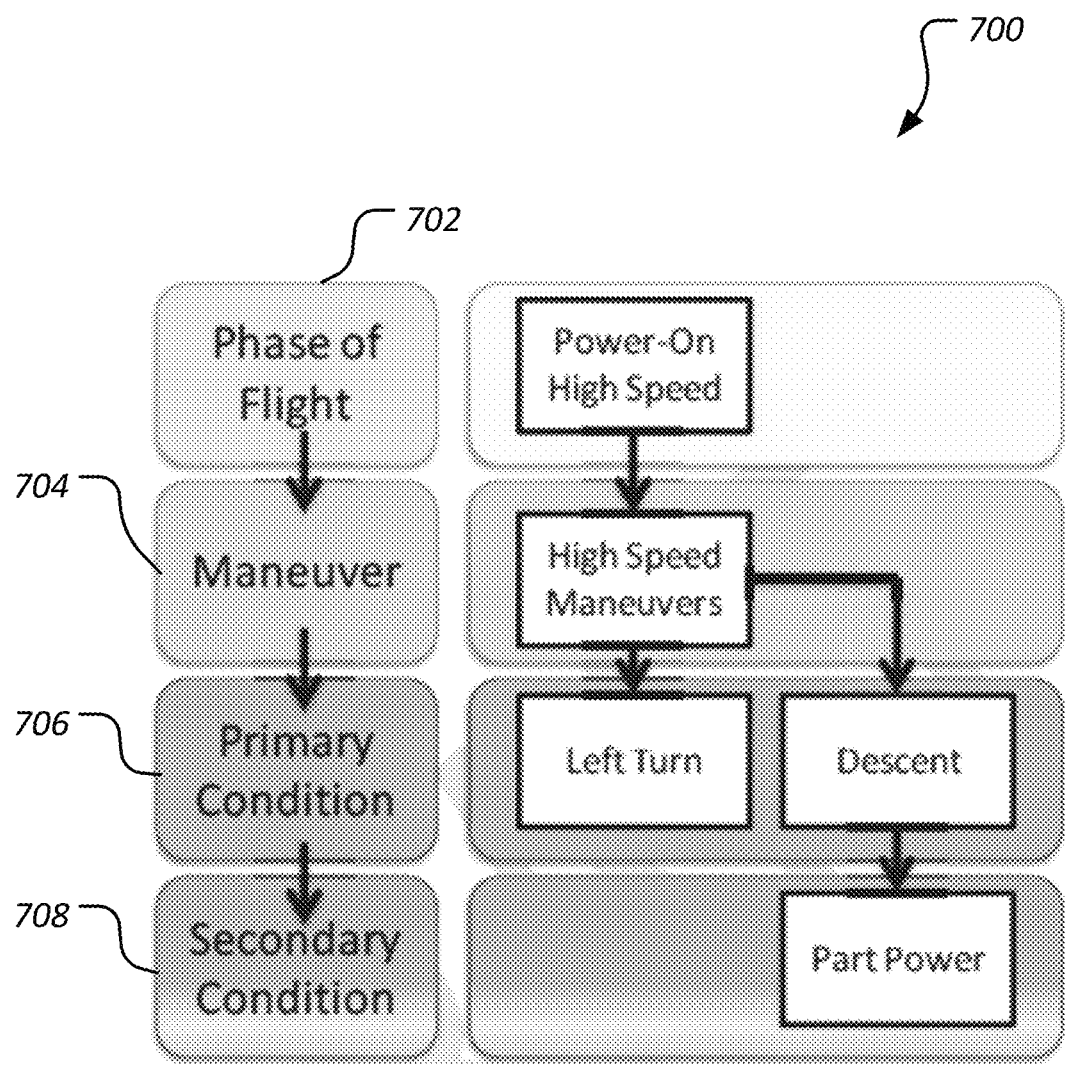
FIG. 7 shows a flowchart of a method of operating a system comprising a regime engine and a results communication system.

In some embodiments, regime engine 422 can be operated as shown in FIG. 7 to search through the data in a hierarchical, multi-pass, manner that identifies the highest level of regimes first and lowest level of regimes last. In such cases, the regime engine 422 can first parse data to identify a phase of flight 702. Next, the regime engine 422 can search for the presence of a maneuver 704 that is a sub-regime of the phase of flight 702 regime. Next, the regime engine 422 can search for the presence of a primary condition 706 that is a sub-regime of the maneuver 704 regime and a sub-sub-regime of the phase of flight 702 regime. Further, the regime engine 422 can search for the presence of a secondary condition 708 that is a sub-regime of the primary condition 706 regime, a sub-sub-regime of the maneuver 704 regime, and a sub-sub-sub-regime of the phase of flight 702 regime. In some embodiments, each tier of regimes is identified according to so-called normal definitions and block definitions prior to utilizing lower tiers of regime definitions to parse the data. Normal definitions of regimes can be structured based on entry and exit criteria. The entry and/or exit criteria can be defined with one or more parameters, thresholds, and durations. As a simple example, a one parameter entry condition could be that a regime is entered when an indicated airspeed is greater than or equal to 100 knots and less than 150 knots for at least five seconds.

In some cases, regimes can be defined as having relative priorities so that when a higher priority regime occurs during a same time as lower priority regimes, only the higher priority regime is registered as occurring during the period in which the regimes overlapped. Still further, block definitions can be used to make defining multi-state regimes more clear. The regimes that define a block regime can only be normal definition type regimes. Further, the regimes that define a block regime must have the same parent regime. Still further, block definitions have no priority value, block definitions can overlap other block definitions, and block definitions can overlap normal definitions in the same tier. A first type of block definition is a regular block definition in which a series of regimes must occur at least partially subsequently in time relative to each other. In some cases, the regime engine 422 can output regime results in line with the flight data that has been analyzed. In some cases, all identified regimes are output per line of data such that larger more specific analysis can be conducted at a later time. More specifically, regime analysis results can be presented in a parenthetical set of successively tiered regimes types in the form of "Phase of Flight (Maneuver (Primary Condition (Secondary Condition)))" so that an entire tiered regime analysis can be communicated in a single collective expression.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system for a rotorcraft, comprising:
a regime engine configured to utilize sequential time-series numerical data to identify a top tier regime from a group of top tier regimes and to subsequently identify a sub-regime of the selected top tier regime; and
a results communication system configured to receive the identified top tier regime or the identified sub-regime from the regime engine and communicate the identified top tier regime or identified sub-regime to a flight computer configured to alter an operation of the rotorcraft as a function of the identified top tier regime or identified sub-regime;
wherein when a portion of the sequential time-series numerical data is recognized by the regime engine as matching multiple top tier regimes, the regime engine is configured to select a regime having a higher priority than the other matching top tier regimes and is configured to associate the higher priority regime with the portion of the sequential time-series numerical data; and
wherein when the regime engine is identifying the sub-regime, the regime engine considers only the portion of the sequential time-series numerical data associated with the higher priority regime.

2. The system of claim 1, further comprising:
visually displaying at least one of the identified top tier regime and the identified sub-regime.

3. The system of claim 1, further comprising;
audibly announcing at least one of the identified top tier regime and the identified sub-regime.

* * * * *